July 21, 1931.  W. MITCHELL  1,815,443
MEANS FOR SELF TEACHING OF WALKING AND DANCING
Filed Nov. 20, 1928
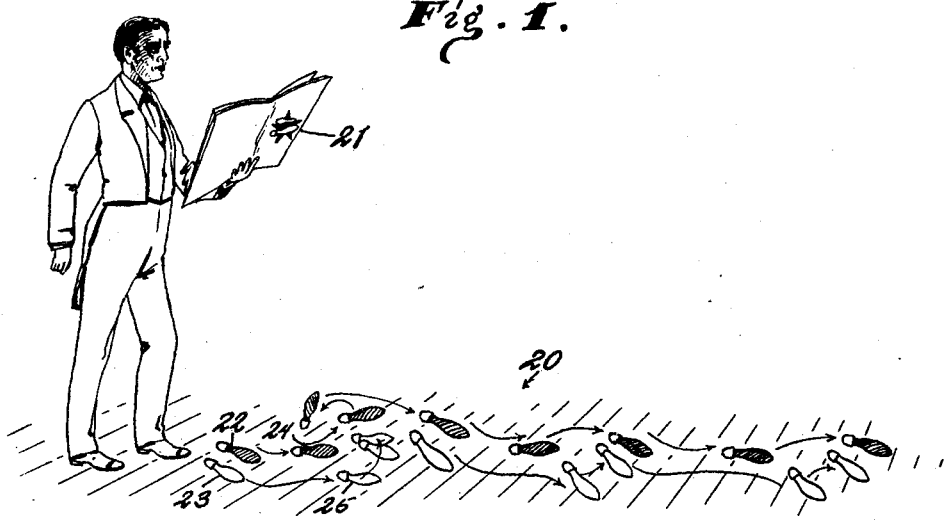
Fig. 1.
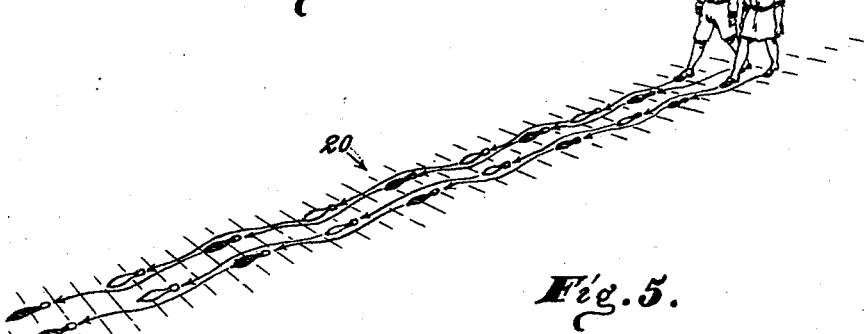
Fig. 2.
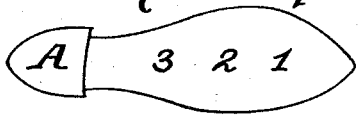
Fig. 3.
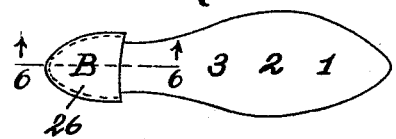
Fig. 5.
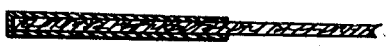
Fig. 6.
Fig. 4.
Fig. 7.
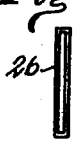
Fig. 8.
Inventor.
Wells Mitchell.
by
Lockwood & Lockwood,
His Attorneys.

Patented July 21, 1931

1,815,443

UNITED STATES PATENT OFFICE

WELLS MITCHELL, OF LOS ANGELES, CALIFORNIA

MEANS FOR SELF TEACHING OF WALKING AND DANCING

Application filed November 20, 1928. Serial No. 320,671.

This invention relates to a means for self-teaching of proper and graceful walking and dancing, and the principal object thereof is to provide a simple and efficient means of self-instruction that is easy to understand and execute.

Another object of the invention is to improve the walking and dancing posture of people who unfortunately in early youth failed to acquire an easy, graceful stride in walking and dancing.

Another object of the invention is to provide a simple and efficient means for self-instruction in walking, dancing, military drills, steps and figures and to that end I provide foot-prints with instructions as to how to arrange them on the floor so that very young children can travel over them so as to acquire, unconsciously, the art of gracefully executing the walking, dancing or military movements.

Other objects, advantages and features of invention may appear from the accompanying drawings, the subjoined detailed description and the appended claim.

The accompanying drawings illustrate the means for self-teaching of correct walking and dancing.

Fig. 1 is a perspective view of a person beginning to study and execute the second phase or picture of the Ramona style of waltzing, diagrammatically indicating the cardboard foot-prints arranged on the floor in the position he is required to travel over them to learn the dance, and also showing him holding the sheet of instructions in his hand so he can read it as he steps from foot-print to foot-print.

Fig. 2 is a perspective view of two young people practicing a correct form of military step or walking together so as to move gracefully and in step with one another.

Fig. 3 is a plan view of one of the cardboard foot-prints with indicia on its face indicating its position in a phase of dance and the time of each measure in which each step is to be taken.

Fig. 4 is an edge view of the foot-print shown in Fig. 3.

Fig. 5 is a view analogous to Fig. 3, showing the heel of the foot-print enclosed in a clip that is used to change the position indicating mark of the footstep as from "A" to "B".

Fig. 6 is a fragmental section on the line 6—6 Fig. 5 with parts greatly out of proportion for the purpose of illustration, as the card-board in actual practice can be very thin.

Fig. 7 is a plan view of the heel clip showing the reverse side of that shown in Fig. 5, or side marked with the letter "A".

Fig. 8 is an edge view of the heel clip shown in Fig. 7 looking into the cavity.

This invention includes sheets of instructions accompanied by card-boards in the form of foot-prints 20 that can be arranged on a floor as directed by the instructions so that a student can travel over them as directed by the instructions and thereby unconsciously acquire the accomplishment of proper walking and graceful dancing.

As illustrated in Fig. 1, the foot-prints 20 are arranged on the floor in front of the student in substantially the same order as he is to pass over them.

To avoid confusion the left foot-prints are shaded as shown in Figs. 1 and 2.

Referring to Fig. 1, it is readily seen that the student is to start from the foot-print 22 on which he places his left foot, then with his right foot on the foot-print 23 he begins traveling over the cardboard foot-prints by first moving his left foot in a short swing to the foot-print 24 and his right foot in a larger swing to the foot-print 25; and this order of movement can be indicated by the capital letters in the heels of the foot-prints as indicated in Figs. 3 and 5 of the foot-prints.

It is obvious that in traveling over the foot-prints as arranged and in time with the music, that even a stupid, awkward person can quickly self-acquire the step of a dance with a more or less degree of gracefulness of movement that otherwise could not be accomplished.

It is obvious that the cardboard foot-prints can be properly arranged on a floor for any of the well known forms or styles of social dancing.

Also as indicated in Fig. 2 the foot-prints can be arranged on the floor in an order for proper walking either with or without an accompanying person. In other words, the boy and girl in the picture can travel over the foot-prints alone until they acquire the method of correctly traveling over them in proper time, and when so accomplished they can travel over the steps together so as to acquire the art of stepping in exact time.

As is well known there are very few children who can walk a distance of twenty feet in a straight line without wobbling or staggering toward one side or the other of the line, consequently this method of self-teaching of correct walking can be made a parlor amusement for the young folks as a game to see who is most skillful and graceful in traveling over foot-prints arranged in a straight line and thereby accomplish the art of correct carriage without arduous effort or study.

Also it is obvious from the arrangement of the foot-prints in Fig. 2 that they can be arranged for a military drill.

As shown in Figs. 3 to 8 the foot-prints 20 can be provided with heel clips 26 that carry different letters or data on opposite sides so that they are removable and interchangeable for various steps or dances.

In pursuing this method of self-teaching and employing the means thereof the student is instructed how to lay the foot-prints and travel over them in a predetermined manner. In the event that the student is a beginner either in the art of proper walking or dancing, it is advisable to employ the cardboard foot-prints laid out in proper order on a floor over which to travel so as to acquire a proper distance and carriage in stepping. A more advanced student, however, who already has acquired the art of correct walking and dancing, can readily acquire the steps in a new dance by reading the complete instructions in the sheet, as shown in conjunction with the picture of the foot-prints thereof.

I claim as my invention:

A card-board in the form of a foot print adapted to be placed on a floor and used with other similar pieces to teach correct walking and dancing in combination with a removable heel clip adapted to be placed over the heel end of said card-board for the purpose specified.

In witness whereof, I have hereunto affixed my signature.

WELLS MITCHELL.